Sept. 27, 1966  A. W. FENNELL, JR  3,275,864
D.C. MACHINE AND INTERNAL CONNECTIONS THEREFOR
Filed Dec. 31, 1963  3 Sheets-Sheet 1

WITNESSES:
John L. Chopp
Edward F. Possessky

INVENTOR
Arthur W. Fennell, Jr.
BY F. P. Lyle
ATTORNEY

Sept. 27, 1966  A. W. FENNELL, JR  3,275,864
D.C. MACHINE AND INTERNAL CONNECTIONS THEREFOR
Filed Dec. 31, 1963  3 Sheets-Sheet 2

Sept. 27, 1966    A. W. FENNELL, JR    3,275,864
D.C. MACHINE AND INTERNAL CONNECTIONS THEREFOR
Filed Dec. 31, 1963    3 Sheets-Sheet 3

United States Patent Office 3,275,864
Patented Sept. 27, 1966

3,275,864
D.C. MACHINE AND INTERNAL CONNECTIONS THEREFOR
Arthur W. Fennell, Jr., Monroeville, Pa., assignor to Westinghouse Electric Corporation, East Pittsburgh, Pa., a corporation of Pennsylvania
Filed Dec. 31, 1963, Ser. No. 334,706
7 Claims. (Cl. 310—180)

The present invention relates to dynamoelectric machines and more particularly to improved circuit connections in D.C. machines.

In embodying a circuit design for a machine into machine structure, it is desirable that various conductor connections be made as simply and conveniently as is consistent with efficient machine operation. This mechanical design goal is often readily achieved to a satisfactory extent, but in some cases one or more necessary connections seemingly must be made in an undesirable and inefficient manner.

One such difficulty is encountered in compensated D.C. machines where end connections for series field strap windings are preferably or necessarily made on the machine side opposite to the side on which the commutator and armature rings are disposed. Such an arrangement generally provides excellent space utilization for compactness in the finished unit, but the difficulty arises in connecting the series coils or straps in series relation with the armature circuit since the armature rings are disposed on the opposite side of the machine.

External connectors have been employed for this purpose but are objectionable from the standpoint of cost and inconvenience since they normally must be extended under the machine frame and through the machine end bell. Further, the resulting external current loop produces ampere turns about the machine shaft and bearing wear is thus adversely affected by the resulting magnetic flux through the shaft.

In accordance with the principle of the present invention, a series connection of the series coils or straps with the armature circuit in a compensated D.C. machine is efficiently established by means of one or more pole face conductors normally circuited only as a part of the compensating field winding. External connections and the associated disadvantages are thus avoided while required circuitry is established without adversely affecting machine operation.

It is, therefore, an object of the invention to provide a novel compensated D.C. machine in which the series coils or straps are connected to the armature circuit in an economic and efficient manner.

Another object of the invention is to provide a novel compensated D.C. machine in which the series coils are connected to the armature circuit without the use of external connections so as to eliminate shaft magnetic flux due to such connectors and thereby improve bearing wear characteristics.

A further object of the invention is to provide a novel compensated D.C. machine in which the series coils or straps are connected to the armature circuit without the use of external connectors so as to eliminate the relatively costly structure and manufacturing steps associated therewith.

These and other objects of the invention will become more apparent upon consideration of the following detailed description along with the attached drawings, in which.

Figure 2:
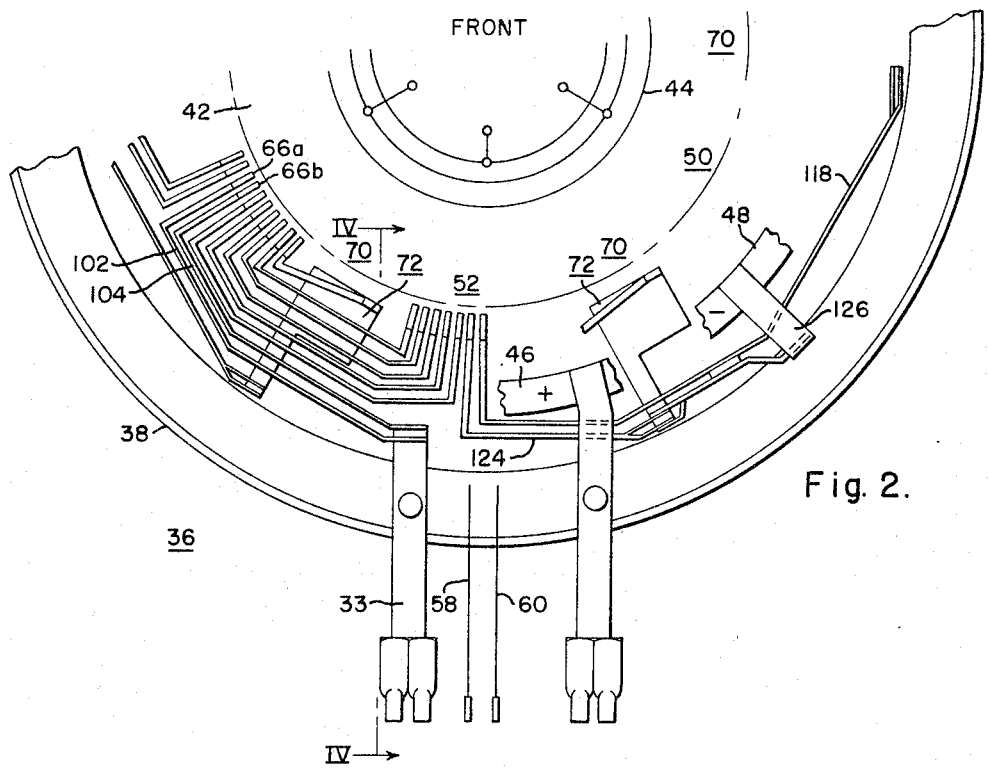
FIGURE 2 shows a portion of a front elevational view of a D.C. machine constructed in accordance with the principles of the invention but having portions thereof removed and portions thereof shown in outline for clarity.
Figure 3:
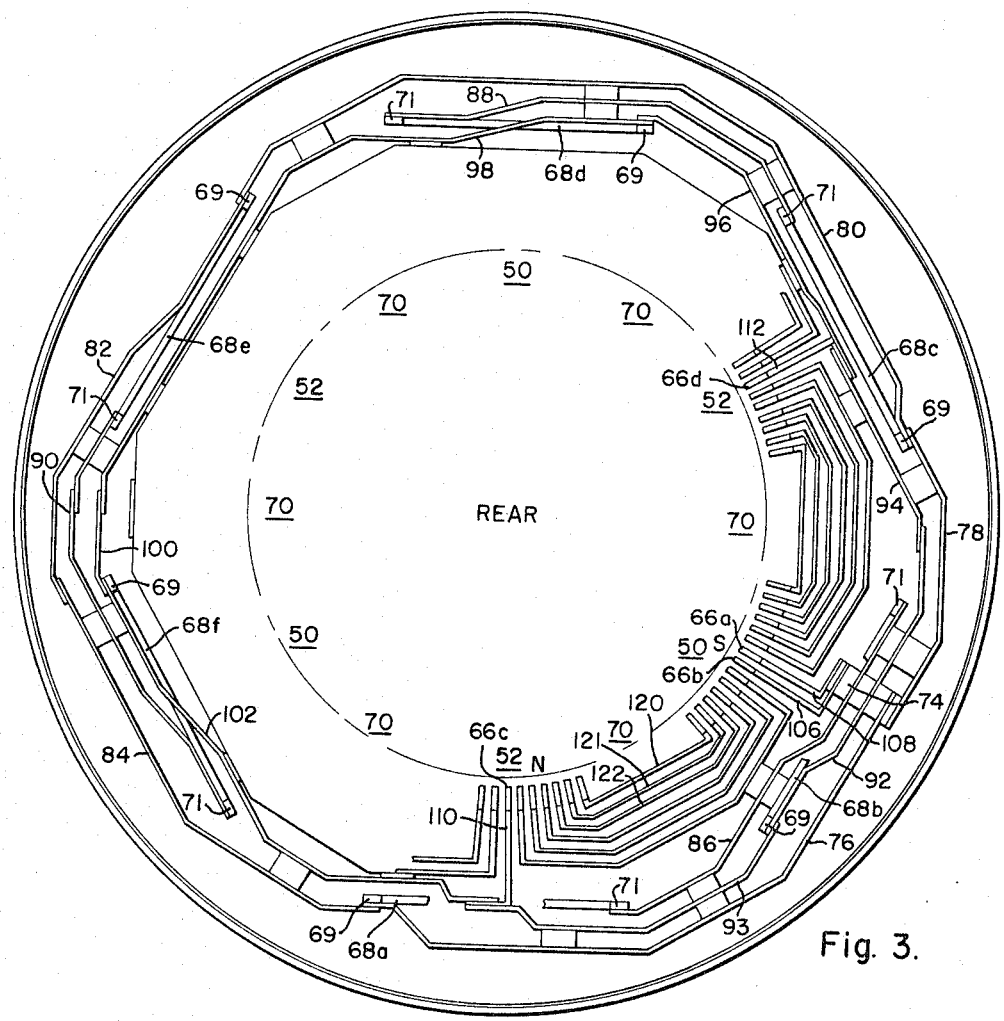
Figure 7:
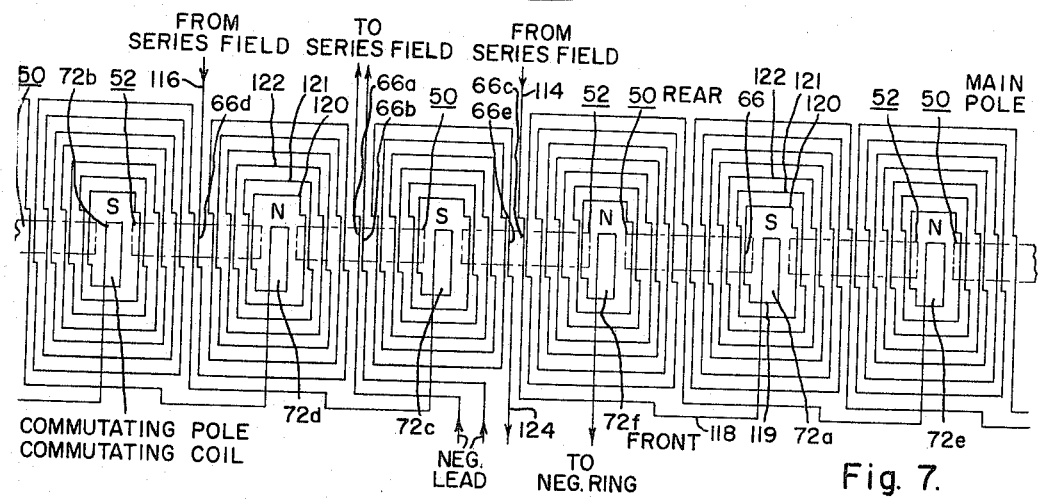
Figure 4:
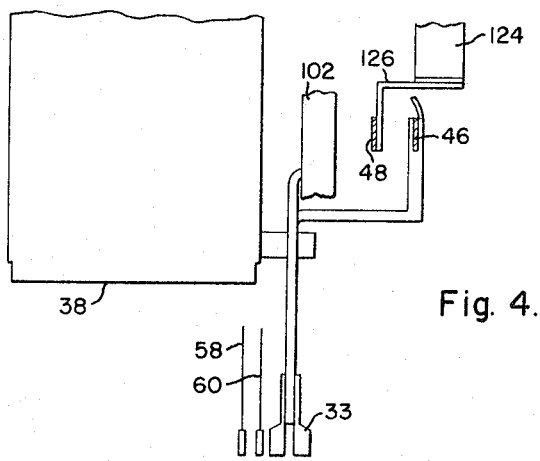
Figure 5:
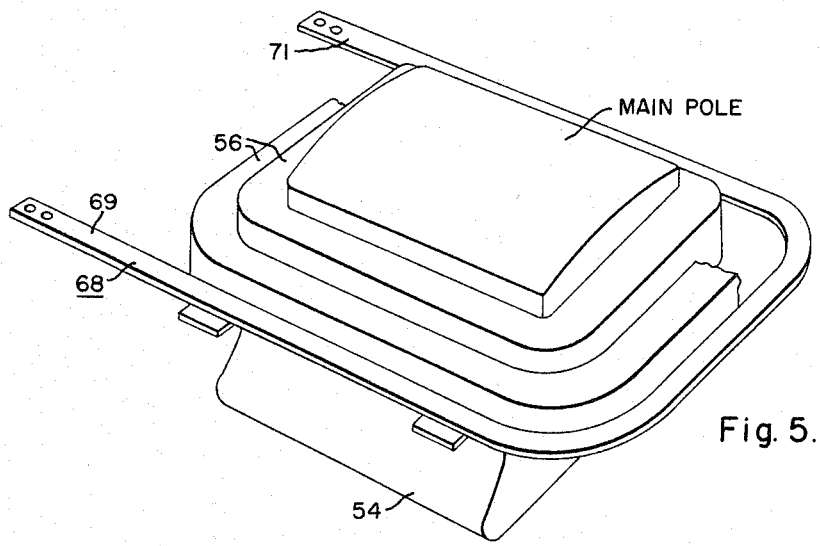
Figure 6:
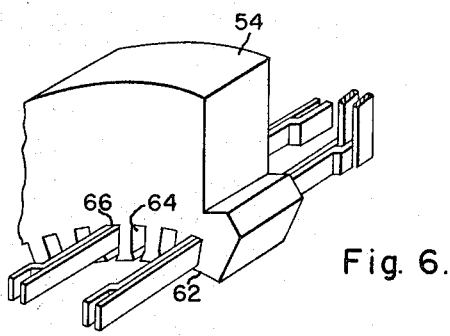

FIGURE 3 similarly shows a rear elevational view of the machine of FIGURE 2;

FIGURE 4 shows significant portions of a longitudinal section of the machine in outline and it is taken along the reference line IV—IV of FIGURE 2;

FIGURE 5 shows a perspective view of a main pole employed in the machine of FIGURES 2 and 3;

FIGURE 6 is another perspective view of the main pole arranged to show compensating winding conductors employed therewith; and FIGURE 7 shows a specific wiring diagram of the interconnections among the compensating, commutating and series field windings or conductors employed in the machine of FIGURES 2 and 3.

Figure 1:
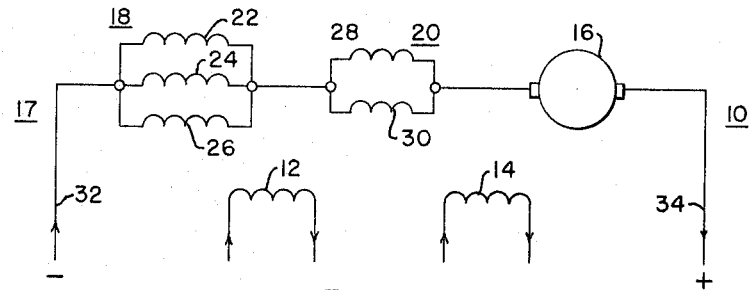
FIGURE 1 is a generalized schematic view of a machine circuit which can be embodied in a machine structure in accordance with the principles of the invention.

More specifically, there is generally shown in FIGURE 1 a circuit 10 which along with obviously modified or similar circuits, can be embodied in a D.C. machine in accordance with the principles of the invention. One or more self or separately excited winding means, such as winding means 12 and 14, are provided as a shunt field for the circuit 10, and an armature circuit 16 is connected in a series circuit 17 with a differential series field 18 and a commutating and compensating field 20.

The differential series field 18 is divided into three branches with series field winding means 22, 24 and 26 in the respective branches. The commutating and the compensating fields 20 are divided into two branches with winding means 28 and 30 in the respective branches. The manner in which the field winding means 12, 14, 22, 24, 26, 28 and 30 are physically disposed and interconnected will subsequently be determined in connection with the mechanical description of the machine structure. Output terminals 32 and 34 for the series circuit 17 provide for power output in the case of a generator or for power input in the case of a motor.

A machine 36 constructed in accordance with the principles of the invention is shown in FIGURES 2-6, and the structural aspects of the machine 36 which are significant to the invention will now be considered. Thus, the machine 36 is designed in this instance to operate as a generator and for this purpose is provided with a frame 38 within which a rotor (not shown) is disposed on a shaft (not shown) for driven rotation.

Adjacent a front side or end of the machine (the side viewed in FIGURE 2), there is provided a commutator 44 (which is shown only in outline) and there are provided six brushes (not shown) which cooperate with the commutator to deliver D.C. power to respective fixed conductive armature rings 46 (positive) and 48 (negative) which are spaced from each other in the axial direction as indicated in FIGURE 4. The structural character of the commutator 44 and the noted brushes as well as the operation thereof will not be described further herein since this information is well understood in the pertaining art. It is noted generally, however, that three pairs of brushes are provided since three pairs of main field poles 50 and 52 are disposed about the inner periphery of the frame 38.

Structurally, each field pole 50 or 52 comprises a magnetic pole piece or shoe 54, as observed in FIGURES 5 and 6, and a plurality of winding means disposed thereon. In particular, a shunt coil 56 is disposed on each pole piece 54 and the coils 56 are suitably interconnected to form the shunt field winding means 12 and 14 which are energized through shunt field supply leads 58 and 60 (FIGURE 2). In addition, face 62 of each pole piece 54 is slotted as indicated by the reference character 64 for the purpose of receiving respective bar conductors 66 which provide compensating flux in the machine air gap so as to offset the effects of armature reaction cross magnetic flux. Thus, when the conductors 66 are interconnected as subsequently described, compensating field winding means are formed.

One or more series field straps 68 are also provided on each pole piece 54, and when the series field straps 68 are interconnected for operation, the differential series field 18 is formed in the circuit 10. To provide for efficient space utilization, an open end of each strap 68, which is generally U-shaped, faces to the rear side of the machine 36. The interconnections among the straps 68 to form the differential series field 18 thus are made on the rear side of the machine and, in order to establish a connection from the differential series field 18 to negative power output lead 33 (as indicated by the reference character 33 in FIGURE 2 to correspond with lead 32 in the circuit diagram of FIGURE 1), it is necessary to provide one or more interconnecting conductive paths from the rear of the machine 36 to the front thereof. This interconnection, and more generally, other connections required for the series power generating circuit 17 (FIGURE 1) are established without the employment of external rear-to-front conductors as shown structurally in FIGURES 2 and 3. Thus, end connecting portion 69 of alternate series field straps 68a, 68c and 68e (which correspond in this case to the alternate or north magnetic poles 52) are interconnected through rigid conductor means or conductive bars 74, 76, 78, 80, 82 and 84 for the ultimate connection to negative power output terminal 33 (FIGURE 2). Further, connecting end portions 71 of the series field straps 68a, 68c and 68e are then serially connected through respective conductor means 86, 88 and 90 to connecting end portions 71 of series field straps 68b, 68d and 68f. In turn, end connecting portions 69 of series field straps 68b, 68d, and 68f are interconnected through conductor means or conductor bars 92, 93, 94, 96, 98, 100 and 102 for ultimate connection to the negative ring 48 of the armature circuit through the commutating windings 72 and compensating conductors 66.

From the foregoing description, it is thus observed that successive pairs of series field straps 68a and 68b, 68c and 68d, and 68e and 68f are respectively connected in series to form the three winding means 22, 24, 26 in the three branches of the differential series field 18 described in connection with the schematic circuit 10 in FIGURE 1. Further, the series connected straps 68a and 68b, 68c and 68d, 68e and 68f are connected reversely, that is they are connected in a manner which results in opposite current flow directions in the adjacent series connected straps so that the main poles corresponding to the series connected straps and being adjacent to each other are characterized as opposite magnetic pole types (north and south).

To connect the negative power output terminal 33 at the front of the machine to the end connecting portion 69 of the series field straps 68a, 68c and 68e, one or more compensating conductors 66 in one or more of the pole pieces 54 are employed. In this instance, two such compensating conductors 66a and 66b are preferably employed for reasons which will subsequently become more apparent. Adjacent the front of the machine 36, rigidly supported bar conductors 102 and 104 are conductively engaged with the conductors 66a and 66b and are in addition conductively attached to the negative power output terminal 33. Completion of the series field connection is then provided adjacent the rear side of the machine 36 by means of bar conductors 106 and 108 rigidly supported and interconnected to the conductor means 74 which in turn is interconnected through conductor means as previously described to the end connecting portions 69 of the series field straps 68a, 68c and 68e. With the series connection established as described, external connectors and the disadvantages associated therewith are thus avoided, while each of the compensating conductors 66a or 66b carries substantially one-half of the series current which, as determined subsequently, is consistent with that carried by each of the other compensating conductors 66. Compensating action within the machine 36 is thus substantially unaffected by this advantageous employment of the compensating conductors 66a and 66b. It is noted that since FIGURE 1 is a generalized schematic, the precise circuit location of the dually functional conductors 66a and 66b is not shown therein.

The end connecting portions 71 of the series field straps 69b, 69d, and 69f are in turn connected through the remaining compensating conductor bars 66 (which are interconnected to form the aforementioned compensating winding means) and through commutating coils 72 (respectively disposed at interpole locations 72 between each adjacent pair of main poles 50 and 52) to the negative armature ring 48. Adjacent the rear side of the machine 36, the first portion of this connection is established by means of respective conductor bars 110 and 112 which interconnect the conductor bars 102, 93, 94, and 96 to respective compensating conductors 66c and 66d. The remaining compensating conductor bars 66 and the commutating coils 72 are then interconnected to form the two parallel winding means branches described for the commutating and compensating field winding means 20 (FIGURE 1).

More specifically, commutating and compensating field branches 114 and 116 (FIGURE 7) are respectively started through compensating conductors 66c and 66d. Compensating conductor 66c is then interconnected through rigid strap conductor 118 to commutating coil 72a which then is connected through conductor 119 to compensating conductor 66. The latter conductor is located on south pole 50 adjacent to the north pole 52 in which the compensating conductor 66c is disposed. From this point, rigid strap conductors 120, 121, 122, etc. are employed to establish winding means through the remaining compensating conductors 66 on adjacent poles 50 and 52 with interpole commutating windings 72b and 72c additionally serially connected in the branch 114 in a manner similar to that described for the interpole commutating winding 72a. The branch 114 is then completed through compensating conductor 66e and conductor means or bar conductor 124 (FIGURE 2) which is then interconnected with the negative armature ring 48 through conductive support member 126.

In a manner similar to that just described, the commutating and compensating field branch 116 is initiated through compensating conductors 66 and strap connectors 120, 121, 122, etc. and through commutating windings 72d, and 72e and 72f. From the commutating windings 72f, a connection is established to bar conductor 124 which in turn is connected to the negative armature ring 48 as previously described.

Since the compensating and commutating field winding means are divided into two branches in the series circuit 17, each of the compensating bars 66 included in the branch 114 or 116 carries substantially one-half of the series current. The previously noted fact that the series field strap connecting conductors 66a and 66b also each carry substantially one-half of the series current means that the conductors 66a and 66b also provide flux compensating action substantially equal to that of all the other compensating conductors 66 including those on the pole 50 where the conductors 66a and 66b are located. It is noted of course, also that the direction of the current is identical through the series field strap connecting conductors 66a and 66b and the compensating conductors 66 on the same pole 50.

The foregoing description has been set forth only to illustrate the principles of the invention. Accordingly, it is desired that the invention be not limited by the embodiment described here, but, rather, that it be accorded an interpretation consistent with the scope and spirit of its broad principles.

What is claimed is:

1. In a compensated D.C. dynamoelectric machine, a frame having a plurality of magnetic field pole pieces disposed about its inner periphery, a plurality of compensating conductors extending axially along an inner face of each of said pole pieces, series field strap means disposed on each of said pole pieces and having end connecting portions thereof located on one side of said machine, and means within said machine frame for serially interconnecting said series field strap means between an armature power terminal and an armature circuit ring terminal both of which are located on the side of said machine opposite said one side, said interconnecting means including at least one of said compensating conductors connected between said series field strap means and one of said terminals, the balance of said compensating conductors interconnected to form at least one compensating winding means physically distributed over said pole pieces in series circuit relation between said series field strap means and the other of said terminals.

2. In a compensated D.C. dynamoelectric machine, a frame having a plurality of magnetic field pole pieces disposed about its inner periphery, a shunt winding disposed on each of said pole pieces, conductor means associated with said shunt windings for connecting said shunt windings to a power source, a plurality of compensating conductors extending axially along an inner face of each of said pole pieces, series field strap means disposed on each of said pole pieces and having end connecting portions thereof located on one side of said machine, means within said machine frame for serially interconnecting said series field strap means between an armature power terminal and an armature circuit ring terminal both of which are located on the side of said machine opposite said one side, said interconnecting means including at least one of said compensating conductors connected between said series field strap means and one of said terminals, the balance of said compensating conductors interconnected to form at least one compensating winding means physically distributed over said pole pieces in series circuit relation between said series field strap means and the other of said terminals, and a plurality of interpole commutating winding means disposed about the inner periphery of said frame between adjacent field pole pieces and interconnected in series circuit relation with said field strap means and said compensating winding means.

3. In a compensated D.C. dynamoelectric machine, a frame having a plurality of magnetic field pole pieces disposed about its inner periphery, a plurality of compensating conductors extending axially along an inner face of each of said pole pieces, series field strap means disposed on each of said pole pieces and having end connecting portions thereof located on one side of said machine, said series field strap means divided into a plurality of parallel circuit branches, and means within said machine frame for serially interconnecting the parallel branch combination of said series field strap means between an armature power terminal and an armature circuit ring terminal both of which are located on the side of said machine opposite said one side, said interconnecting means including at least one of said compensating conductors connected between said series field strap means and one of said terminals, the balance of said compensating conductors interconnected to form at least one compensating winding means physically distributed over said pole pieces in series circuit relation between said series field strap means and the other of said terminals.

4. In a compensated D.C. dynamoelectric machine, a frame having a plurality of magnetic field pole pieces disposed about its inner periphery, a plurality of compensating conductors extending axially along an inner face of each of said pole pieces, series field strap means disposed on each of said pole pieces and having end connecting portions thereof located on one side of said machine, said series field strap means divided into a plurality of parallel circuit branches, and means within said machine frame for serially interconnecting the parallel branch combination of said series field strap means between an armature power terminal and an armature circuit ring terminal both of which are located on the side of said machine opposite said one side, said interconnecting means including a pair of said compensating conductors connected between said series field strap means and one of said terminals, the balance of said compensating conductors interconnected to form a pair of compensating winding means physically distributed over said pole pieces in parallel circuit relation to each other and in series circuit relation between said series field strap means and the other of said terminals.

5. In a compensated D.C. dynamoelectric machine, the combination as set forth in claim 2 wherein there is also provided a shunt winding disposed on each of said pole pieces and conductor means associated with said shunt windings for connecting said shunt windings to a power source.

6. In a compensated D.C. dynamoelectric machine, a frame having a plurality of magnetic field pole pieces disposed about its inner periphery, a plurality of compensating conductors extending axially along an inner face of each of said pole pieces, series field strap means disposed on each of said pole pieces and having end connecting portions thereof located on one side of said machine, means within said machine frame for serially interconnecting said series field strap means between an armature power terminal and an armature circuit ring terminal both of which are located on the side of said machine opposite said one side, said interconnecting means including a plurality of said compensating conductors connected between said series field strap means and one of said terminals, the balance of said compensating conductors interconnected to form a plurality of compensating winding means physically distributed over said pole pieces in parallel circuit relation to each other and in series circuit relation between said series field strap means and the other of said terminals, and a plurality of interpole commutating winding means disposed about the inner periphery of said frame between adjacent field pole pieces and equally divided for interconnection in series in respective circuit branches which include respectively said compensating winding means and said field strap means.

7. In a compensated D.C. dynamoelectric machine, a frame having six main magnetic field pole pieces disposed about its inner periphery, a shunt winding disposed on each of said pole pieces, first conductor means associated with said shunt windings for connecting said shunt windings to a power source, a plurality of compensating conductors extending axially along an interface of each of said pole pieces, at least one series field strap disposed on each of said pole pieces and having a pair of end connecting portions thereof located on one side of said machine, second conductor means interconnecting one connecting end portion of alternate ones of said series field straps, third conductor means interconnecting said one connecting end portion of the remaining alternate series field straps, fourth conductor means interconnecting the other end portion of adjacent pairs of said series field straps so that said series field straps are arranged in a circuit combination having three parallel branches with two reversely connected straps in each branch, and means within said machine frame for serially interconnecting said series field strap circuit combination between an armature power terminal and an armature circuit ring terminal both of which are located on the side of said machine opposite said one side, said interconnecting means including at least a pair of said compensating conductors connected between said series field strap circuit combination and one of said terminals, the balance of said compensating conductors interconnected to form at least a pair of compensating winding means physically distributed over said pole pieces in parallel circuit relation to each other and respectively in series circuit relation with said series field strap circuit combination, a plurality of interpole commutating windings disposed about the inner periphery of said frame between adjacent field pole pieces and equally divided for interconnection with said compensating winding means so as to form a pair of commutating and compensating field winding circuit branches serially connected between said field strap circuit combination and the other of said terminals.

No references cited.

MAX L. LEVY, Primary Examiner.

MILTON O. HIRSHFIELD, Examiner.

L. L. SMITH, Assistant Examiner.